Sept. 12, 1939.    J. B. VICTOR    2,173,006
GREASE RETAINER WITH COPPER WASHER
Filed March 1, 1937

JOSEPH B. VICTOR
INVENTOR
PER Albert J. Fihe
ATTORNEY

Patented Sept. 12, 1939

2,173,006

UNITED STATES PATENT OFFICE 2,173,006

GREASE RETAINER WITH COPPER WASHER

Joseph B. Victor, Oak Park, Ill., assignor to Victor Manufacturing & Gasket Company, Chicago, Ill., a corporation of Illinois Application March 1, 1937, Serial No. 128,430

3 Claims. (Cl. 288—3)

This invention relates to an improved grease retainer with copper washer, and has for one of its principal objects the provision of a grease retainer, oil seal or fluid seal generally, which includes a molded diaphragm or sealing element which, during the process of molding, is vulcanized to or otherwise affixed upon a metal washer or support, the sealing element with its supporting washer being then firmly and non-leakably mounted in a housing or shell.

One of the important objects of this invention is to provide in a grease retainer or fluid seal of the class described a novel means of preventing leakage between the metal parts of the seal itself as distinguished from leakage between the diaphragm or sealing element and the shaft which it encircles or encompasses.

One of the important objects of this invention is to provide in a fluid seal or the like means for insuring against any possibility of leakage therethrough or therearound by the use of an additional sealing element or washer of metal or the like, which is softer and more ductile or malleable than the material of which the containing shell is usually made, namely, cold rolled sheet steel, and which therefore affords a sealing action which could not be accomplished by the use of cold rolled sheet steel or similar material per se.

Another and still further important object of the invention is the provision in an oil seal or grease retainer of a separate sealing element distinguished from the flexible packing which acts between two adjacent metal surfaces, and which may be either folded around the edges of one of such metal parts or may simply constitute a flat gasket-like element. This gasket may be of a relatively soft metal, such as copper or lead, or may be composed of cork, fiber, impregnated paper or the like.

Another and still further important object of the invention is the provision of an improved method for positioning the copper or other sealing element in the metal shell and about its particular associated parts and in proper sealing relationship therewith.

Other and further important objects of the invention will be apparent from the disclosures in the accompanying drawing and following specification.

The invention, in a preferred form, is illustrated in the drawing and hereinafter more fully described.

Figure 1:
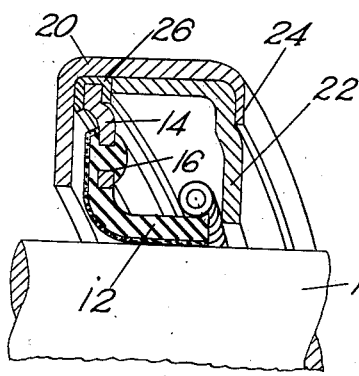
Figure 1 is a cross sectional view of an improved fluid seal made in accordance with the principles of this invention and showing the same as applied to a rotatable shaft.

Reference numeral 12 indicates generally the diaphragm or sealing element of the improved grease retainer or fluid seal of this invention, this diaphragm preferably comprising some moldable material such as synthetic rubber or the like, which in turn, during the process of vulcanization and molding is integrally built onto a metal washer or the like 14, which has openings 16 therein, through which the rubber-like material of the diaphragm 12 is extruded during the vulcanizing operation, thereby forming a very close and practically irremovable connection between the metal and the material of the diaphragm itself.

In order that the diaphragm with its sustaining washer can be supported in proper position about a rotatable shaft or the like 18, the same is preferably mounted in a containing shell or housing, which in this case is composed of two cup-shaped elements 20 and 22 respectively, the element 22 being adapted to slidably fit into the shell 20 and be maintained therein in proper position by means of a downturned or overspun rim 24 of the shell 20.

It has been found that devices of this type are quite satisfactory and that little, if any, leakage will ever occur between the diaphragm 12 and the corresponding surface of the shaft 18. However, some slight leakage has occasionally been found due to seepage of oil or other fluid between the metallic parts 20 and 22 and 14, and in order to eliminate this difficulty an additional sealing element in the shape of a gasket or washer 26 is incorporated into the structure, preferably at and around the periphery of the washer 14. This additional gasket or sealing element is usually composed of some metal softer than the metal of the outer shells, such as copper or lead as distinguished from the steel of the shells. This softer and more ductile metal under pressure will flow into the interstices or crevices between the adjacent steel parts, thereby forming a very tight and quite satisfactory joint at these juxtaposed portions.

Figure 2:
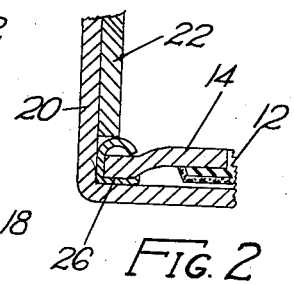
Figure 2 is a detailed sectional view showing one method of assembling the parts which comprise the structure of Figure 1.

In Figure 2 is illustrated one method of assembling the related parts, the copper or lead washer 26 being preliminarily positioned about the periphery of the steel washer 14, which supports the diaphragm or sealing element 12, and as this preliminary positioning does not necessarily include a very tight fit, and in fact, usually forms a loose fit, as shown in Figure 2, the inner cup-shaped shell 22 is driven down onto the assembled parts 20, 26 and 14, before the bead or rim 24 is spun down over the shell 22, thereby forming the tight fit illustrated in Figure 1.

Figure 3:
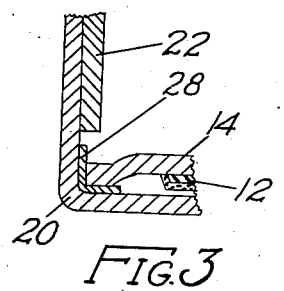
Figure 3 is a view similar to Figure 2, illustrating a slight modification of the assembling procedure.

A slightly modified form of this construction is illustrated in Figure 3, wherein the copper or lead sealing ring 28 is preliminarily made in angular cross section, as shown, and inserted in the bottom of the cup-shaped shell 20, after which the washer 14 with its diaphragm 12 is placed in its desired position and the shell 22 forced downwardly against the upturned edge of the gasket element 28 by means of a rim or punch press, whereupon the uppermost portion of the gasket 28 will be flattened, distorted and foreshortened in its vertical dimension, while at the same time it is compressed into all possible crevices or spaces between the elements 14 and 20. This automatically compensates for disparities in the size relationship of the parts, thereby overcoming any possibilities of leakage which may be due to slight inaccuracies of manufacturing operations, which obviously cannot be conducted on a scale of very high precision and still maintain a production schedule.

Figure 4:
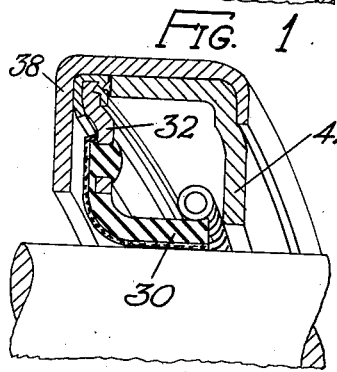
Figure 4 is a view similar to Figure 1, showing a slightly modified form of the invention.
Figure 5:
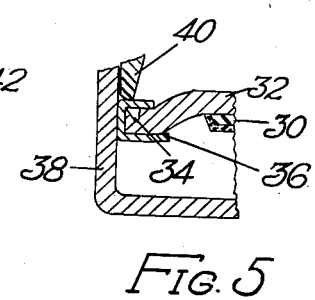
Figure 5 is a detailed sectional view showing the method of assembling portions of the structure of Figure 4.
Figure 6:
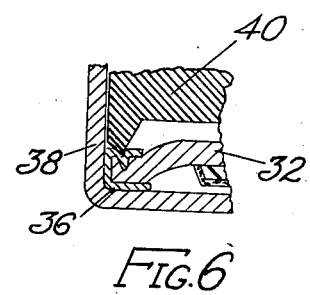
Figure 6 is a detailed sectional view showing the parts of Figure 5 after the assembling operation on these parts has been finished.

In Figure 4 the diaphragm or sealing element 30 is shown as vulcanized onto a washer 32, the washer having a groove 34 in its outer face (Figure 5). The softer metal gasket element 36 is preliminarily wrapped around the periphery of the washer 32 and the assemblage is then placed in the steel shell 38, together with the tool 40, which has a blunt edge, as shown, and upon further downward movement of the tool 40, the parts will be forced into the position shown in Figure 6, with consequent distortion of the gasket 36 into the groove 34 of the diaphragm supporting washer 32. After this has been accomplished, the parts are assembled, as illustrated in Figure 4, with the inner shell 42 in desired position.

Figure 7:
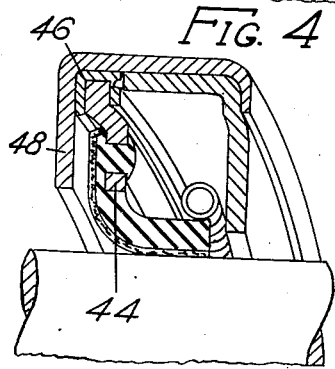
Figure 7 is a detailed sectional view somewhat similar to that of Figure 4, but showing a further modified form of the invention.
Figure 8:
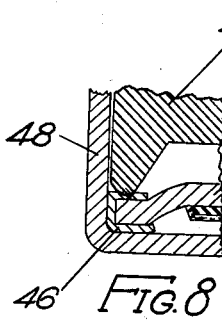
Figure 8 is a detailed sectional view illustrating the preliminary step in the assembling of the structure of Figure 7.

A slight modification of the construction just described is illustrated in Figure 7, wherein the washer 44 does not have the groove 34 therein, but is, as in the last instance, preliminarily surrounded about its periphery by the copper or lead sealing gasket or other element 46, this assemblage being then placed in the bottom of the metal cup or shell 48, as best shown in Figure 8, whereupon the tool 40 of Figures 5 and 6 is again brought into play, but which in this instance simply forms a groove in the upper face of the gasket element 46, thereby distorting or swaging the metal mostly outwardly toward the corresponding inner face or surface of the shell 48, and also somewhat downwardly into the space between the washer 44 and its containing shell.

Figure 9:
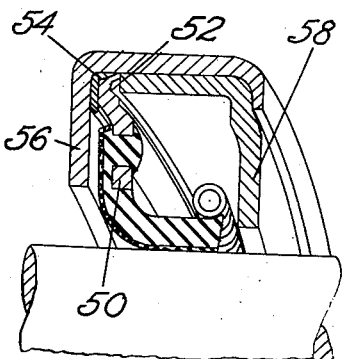
Figure 9 is a sectional view similar to those of Figures 1, 4 and 7, showing a further modification of the invention.

A still further modification is illustrated in Figure 9, wherein the washer 50 has a groove 52 preliminarily formed in its face, and the copper or lead gasket element 54 is preliminarily inserted in the bottom of the shell 56, this copper or lead gasket being somewhat L-shaped in cross section, as illustrated. The inner shell 58 is then forced downwardly into the outer shell 56. Forcing the one shell into the other, spreads the lip portion of the washer 50 against the corresponding face of the outer shell 56, and at the same time compresses the more ductile material of the washer 54 into fluid-tight contact with the adjacent parts.

Figure 10:
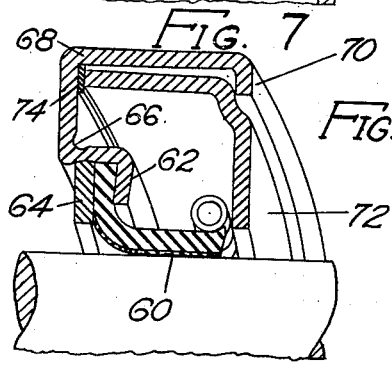
Figure 10 is still another modified form of the invention.

In Figure 10 the diaphragm 60 may be either a piece of leather or molded material clamped between the adjacent portion of the shell 62 and the retaining washer 64, or it may be molded to either or both of these parts. The washer 64 is held in position by outwardly struck protuberances 66.

The element 62 is then bent into an outer shell form 68—70, as illustrated, and an inner shell 72 is provided, as in the other constructions illustrated.

A sealing gasket or the like 74 is positioned at the joint between the two shell elements, and in this case the element 74 is merely a flat ring of suitable material. Obviously this flat ring construction may be employed in the other devices of Figures 1, 4, 7 and 9, or conversely, in the structures of these figures may be employed insofar as is applicable in the apparatus of Figure 10.

It will be evident that herein is provided a fluid seal with an auxiliary gasket construction which will insure adequate oil, grease or the like retaining action under practically all circumstances and conditions, especially when the lead, copper or other gasket element is wrapped around the periphery of one of the main elements of the retainer, as this will result in a soft metal to a hard metal contact completely around at least two and often three surfaces, and even with the plain ring there is a seal between at least two surfaces.

The novel construction of the associated parts also results in a utilization of the features of ductility and malleability. The soft metal is put in under pressure or by means of a blow, and this swaging-like effect provides a perfectly tight seal, both so far as liquids and even air is concerned.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A fluid seal including a flexible packing element, a supporting steel washer therefor, and positioning means for the packing element and washer, said positioning means including an outer cup-shaped shell and an inner shell, both of the same material as the washer, and an auxiliary sealing element composed of a softer metal interposed at the joint between the shells and the washer, a groove in one face of the washer, the material of the softer metal being forced into said groove and into contact with the adjacent parts under pressure.

2. A fluid seal including a flexible packing element, a supporting steel washer therefor, and positioning means for the packing element and washer, said positioning means including an outer cup-shaped shell and an inner shell, both of the same material as the washer, and an auxiliary sealing element composed of a softer metal interposed at the joint between the washer and one shell, and means in the washer providing for the extrusion of a portion thereof against the outer shell, said means comprising a groove in the washer adjacent its periphery.

3. A fluid seal comprising a flexible packing element of synthetic rubber, a supporting offset washer to which the packing element is molded, and positioning means for the washer and packing element, said positioning means including a pair of inter-fitting cup-shaped shells and an auxiliary sealing element of a material softer than the shells, comprising a relatively thin washer positioned about the offset periphery of the first washer and on at least two faces thereof and in compressed distorted relationship with the same adjacent portions of the shells.

JOSEPH B. VICTOR.